(12) United States Patent
Baer

(10) Patent No.: US 7,817,874 B2
(45) Date of Patent: Oct. 19, 2010

(54) IMAGE SENSOR OCCLUSION LOCALIZATION AND CORRECTION APPARATUS, SYSTEMS, AND METHODS

(75) Inventor: Richard L. Baer, Los Altos, CA (US)

(73) Assignee: Micron Technology, Inc., Boise, ID (US)

( * ) Notice: Subject to any disclaimer, the term of this patent is extended or adjusted under 35 U.S.C. 154(b) by 957 days.

(21) Appl. No.: 11/634,562

(22) Filed: Dec. 6, 2006

(65) Prior Publication Data

US 2008/0136947 A1 Jun. 12, 2008

(51) Int. Cl.
G06K 9/40 (2006.01)
G06K 9/62 (2006.01)
G06K 7/00 (2006.01)
H04N 3/14 (2006.01)

(52) U.S. Cl. .................... 382/274; 382/216; 382/312; 348/294

(58) Field of Classification Search .................. 382/151, 382/216, 218, 268, 274, 312; 348/294
See application file for complete search history.

(56) References Cited

U.S. PATENT DOCUMENTS

| 5,247,322 A * | 9/1993 | Edwards ..................... 396/352 |
| 6,498,867 B1 | 12/2002 | Potucek et al. |
| 7,422,353 B2 * | 9/2008 | Tenmyo ..................... 362/551 |
| 2003/0193604 A1 | 10/2003 | Robins et al. |
| 2004/0037457 A1 | 2/2004 | Wengender et al. |

FOREIGN PATENT DOCUMENTS

| DE | 10121545 | 2/2002 |
| EP | 1667434 A1 | 6/2006 |
| WO | WO-2005041558 A1 | 5/2005 |
| WO | WO-2008070122 A2 | 6/2008 |

OTHER PUBLICATIONS

"International Application Serial No. PCT/US2007/024917 Search Report mailed May 28, 2008", 4 pgs.
"International Application Serial No. PCT/US2007/024917 Written Opinion mailed May 28, 2008", 9 pgs.

* cited by examiner

*Primary Examiner*—Daniel G Mariam
(74) *Attorney, Agent, or Firm*—Schwegman, Lundberg & Woessner, P.A.

(57) ABSTRACT

Embodiments described herein may operate to illuminate an image sensor array (ISA) used in, for example, a digital imager alternately using a first illuminator and a second illuminator laterally offset from the first illuminator with respect to a face of the ISA. A reduced illuminance level consistent with an existence of an occlusion may be sensed at an apparent occluded location on the ISA while the occlusion is illuminated with the first illuminator. If an illuminance level consistent with an existence of the occlusion is also sensed at the apparent occluded location while the occlusion is illuminated using the second illuminator, the occlusion may be identified as being located on the ISA. Otherwise, the occlusion may be identified as being located at a position anterior to the ISA, perhaps on a surface of a cover glass associated with the ISA.

36 Claims, 5 Drawing Sheets

IMAGE SENSOR OCCLUSION LOCALIZATION AND CORRECTION APPARATUS, SYSTEMS, AND METHODS

TECHNICAL FIELD

Various embodiments described herein relate to apparatus, systems, and methods associated with imaging and image sensor arrays, including localization and correction of sensor defects.

BACKGROUND INFORMATION

Image sensors are widely used in a variety of consumer electronic devices, including digital cameras and cellular telephones with built-in digital cameras. An image sensor may comprise a matrix of sensor elements. Image quality may be degraded if one or more image sensor elements are occluded.

An occlusion may result from a dust particle becoming lodged against an image sensor element or on a cover glass in front of the image sensor. The occlusion may block some or all light that might otherwise be incident to the image sensor element. If all light is blocked, the image sensor element output signal may remain fixed as the level of light incident to the image sensor element changes. If the incident light is only partially blocked, the image sensor element output signal may vary as the incident light varies. In the latter case, however, the output signal may not be as large as if the image sensor element were not partially blocked.

"Brightness of light" may be referred to hereinafter using the more precise term "illuminance." Units of lux, or lumens per square meter, may be used as a measure of illuminance. An image sensor may convert incident illuminance to analog image sensor element output signals. An analog to digital converter (ADC) may convert the image sensor element output signals to a digital format. A least significant bit (LSB) associated with the ADC may establish a granularity with which an illuminance level sensed by an image sensor element may be measured. Thus, in the field of digital imaging, illuminance may also be expressed in LSB units.

Some commercially available methods may operate to identify unusable image sensor elements at a production facility following fabrication. For example, each production image sensor may be tested and calibrated under controlled conditions. Such methods may incur substantial cost, and may fail to identify occlusions resulting from dust particles that accumulate in an imaging system after production.

Consider, for example, a cellular telephone with a built-in camera. The camera image sensor may have been tested and calibrated at a semiconductor manufacturing facility following fabrication and before shipment to a cellular telephone manufacturer. During the process of incorporating a camera module assembly including the tested image sensor into the cellular telephone, a dust particle inside the camera module may break free and land on the surface of one or more image sensor elements. The resulting occlusion may subsequently manifest itself as a cluster of dark pixels on captured images. Thus, a need to identify and compensate for such occlusions may exist.

DETAILED DESCRIPTION

Figure 1:
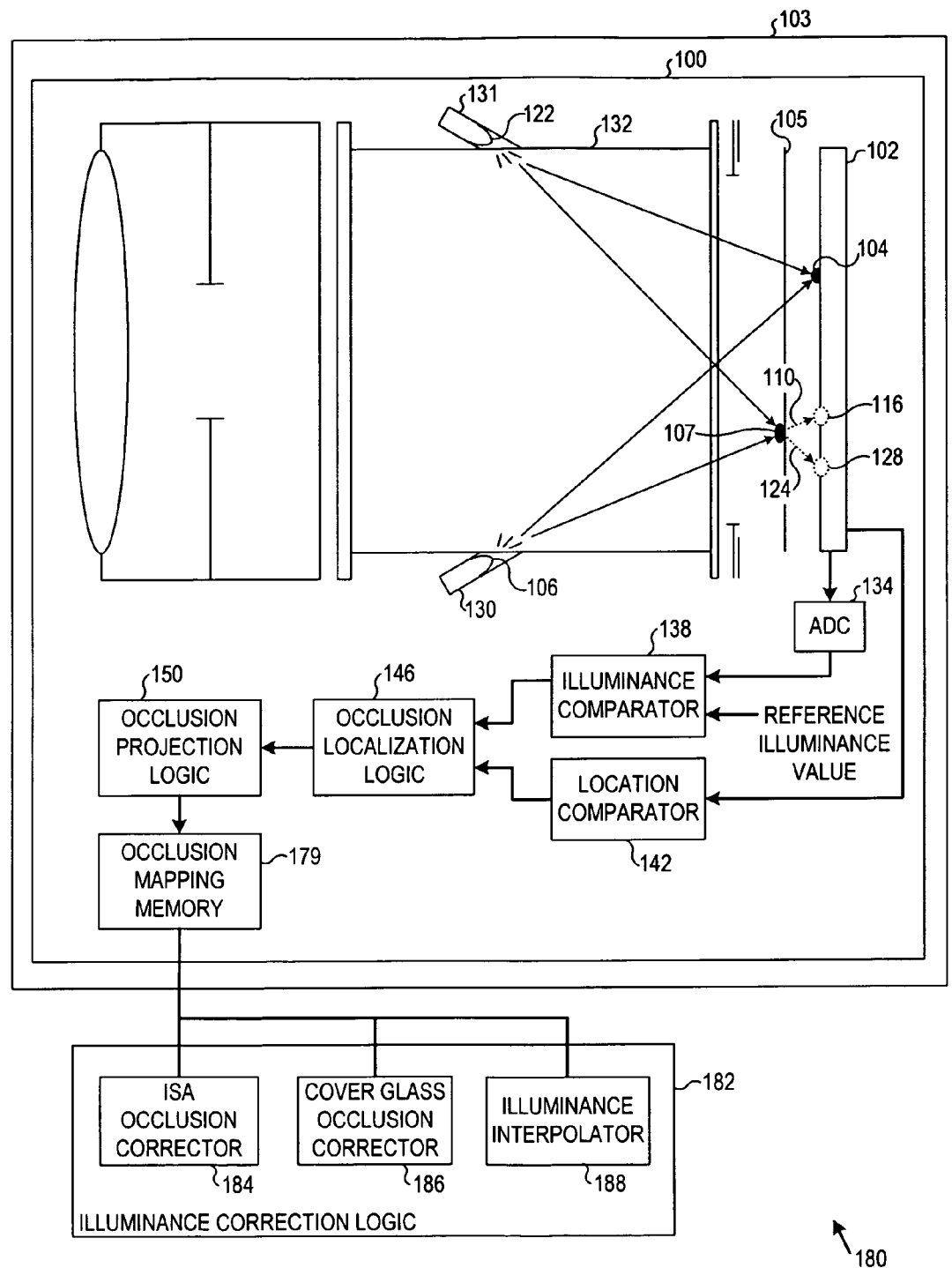
FIG. 1 is a schematic and block diagram of an apparatus and a system according to various embodiments of the invention.

FIG. 1 is a schematic and block diagram of an apparatus 100 and a system 180 according to various embodiments of the invention. Some embodiments described herein may operate to identify one or more occlusions associated with an image sensor array (ISA) 102, as may be employed in a digital imager 103. An occlusion may be localized to the ISA 102 (e.g., an occlusion 104) or to a position anterior to the ISA 102. The position anterior to the ISA 102 may include a location on a surface of a cover glass 105 associated with the ISA 102 (e.g., the location of an occlusion 107). The aforesaid activities may be referred to herein as "occlusion calibration operations." Having isolated the occlusion to the ISA 102 or to the position anterior to the ISA 102 (e.g., to the cover glass 105), an appropriate correction routine may adjust values of illuminance levels sensed by occluded ISA elements. These illuminance value adjustments may be made during or following normal image capture operations. Non-calibration operations may be referred to hereinafter as "through-the-lens (TTL) capture operations" to distinguish the normal operating mode from the occlusion detection and localization mode. The identification of the occlusions and the remediation of their effects may increase customer satisfaction by increasing image quality. Costs may be reduced as a product return rate decreases.

For conciseness and clarity, some embodiments may be described herein in the context of a digital camera. However, embodiments of the invention may be realized in other image sensor-based apparatus, systems, and applications, including cellular telephones, hand-held computers, laptop computers, desktop computers, automobiles, household appliances, medical equipment, point-of-sale equipment, and image recognition equipment, among others.

The apparatus 100 may include a first illuminator 106. During occlusion calibration operations, the first illuminator 106 may project a first shadow 110 from the occlusion 107. The first shadow 110 may be projected onto a first apparent occluded location 116 on the ISA 102 associated with the digital imager 103. In some embodiments, the digital imager 103 may comprise a digital camera, including a single-lens reflex (SLR) camera.

A second illuminator 122 may be laterally offset with respect to the face of the ISA 102 from the first illuminator 106. During occlusion calibration operations, the second illuminator 122 may project a second shadow 124 from the occlusion 107. The second shadow 124 may be projected onto a second apparent occluded location 128 on the ISA 102. The first illuminator 106, the second illuminator 122, or both may comprise light-emitting diodes, among other sources of illumination. The illuminators 106, 122 may be housed within light baffles 130, 131, respectively, and may be located within a lens barrel 132 associated with the digital imager 103.

Although discussions herein may present example geometries wherein the first illuminator 106, the second illuminator 122, the ISA 102, and the cover glass 105 are positioned symmetrically relative to each other (e.g., parallel, orthogonal, horizontally or vertically bisected by planes, and/or equidistant, among other symmetrical relationships), embodiments of the invention are not so limited. Other non-symmetrical geometries are contemplated as within the scope of various embodiments of the invention.

The apparatus 100 may also include an ADC 134 coupled to the ISA 102. The ADC 134 may convert illuminance signals received from ISA elements to digital illuminance values. Each such digital illuminance value may thus represent a level of illuminance sensed at an ISA element. An illuminance comparator 138 may be coupled to the ADC 134. The illuminance comparator 138 may detect an occluded condition at an ISA element (e.g., the first apparent occluded location 116 or the second apparent occluded location 128). The occluded condition may be detected by comparing a value of an illuminance level sensed at the ISA element to a value of a reference illuminance level. The reference illuminance level value may represent a non-occluded condition. The reference illuminance level value may comprise an average of values of illuminance levels sensed at a set of ISA elements surrounding the ISA element. In some cases, the reference illuminance level value may comprise an average of values of illuminance levels associated with a set of all ISA elements in the ISA 102, among other possible reference illuminance values.

The apparatus 100 may also include a location comparator 142 operationally coupled to the ISA 102. The location comparator 142 may compare the first apparent occluded location 116 to the second apparent occluded location 128. Occlusion localization logic 146 may be coupled to the location comparator 142. The occlusion localization logic 146 may flag an occlusion as being located on the ISA 102 (e.g., the occlusion 104) if the first apparent occluded location 116 and the second apparent occluded location 128 are substantially equal. The occlusion localization logic 146 may flag an occlusion as being located at a position anterior to the ISA 102 if the first apparent occluded location 116 and the second apparent occluded location 128 are not substantially equal. In some embodiments, the position anterior to the ISA 102 may include a location on the surface of the cover glass 105 (e.g., the occlusion 107), as previously described.

Figure 2:
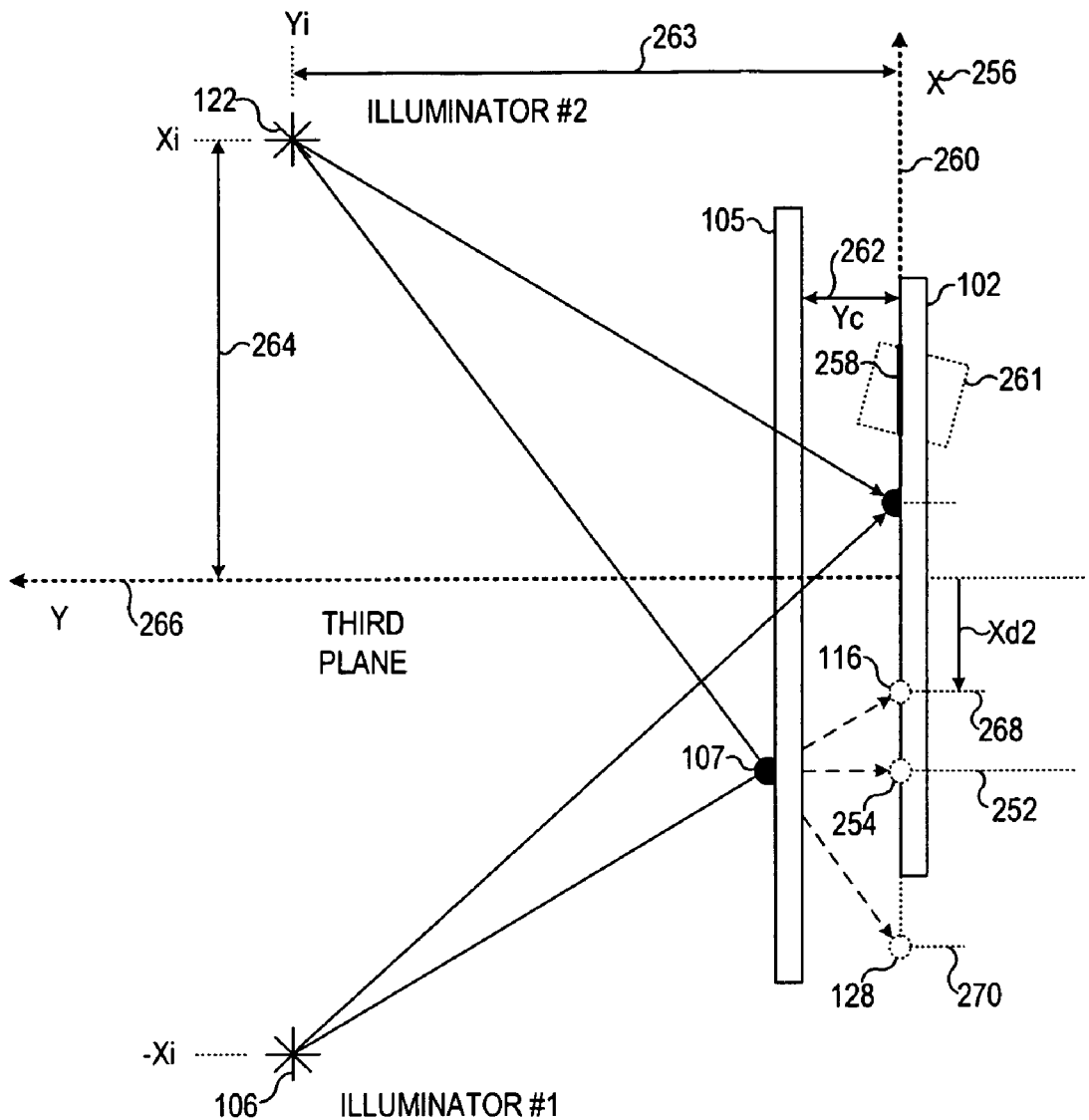
FIG. 2 is an enlarged top-down view of light paths and occlusion shadows according to various embodiments.

FIG. 2 is an enlarged top-down view of light paths and occlusion shadows associated with an apparatus 100 according to various embodiments. The apparatus 100 may also include occlusion projection logic 150 coupled to the occlusion localization logic 146, as shown in FIG. 1. The occlusion projection logic 150 of FIG. 1 may calculate a position of an occluded location 254 on the ISA 102. The position of the occluded location 254 may be calculated as an orthogonal projection onto the ISA 102 of the occlusion 107 located on the cover glass 105.

The occlusion projection logic 150 may be configured to determine a position 252 of the occluded location 254 in a first dimension 256. The position 252 of the occluded location 254 may lie substantially along a line of intersection 258 of a plane 260 of the ISA 102 with a second plane 261 orthogonal to the plane 260 of the ISA 102 and horizontally bisecting the ISA 102.

In some embodiments, the position 252 of the occluded location 254 in the first dimension 256 may be calculated as a function of a perpendicular distance $Y_C$ 262 between the ISA 102 and the cover glass 105. A perpendicular distance Yi 263 between the ISA 102 and the first illuminator 106 or the second illuminator 122 may also be included in the calculation. A perpendicular distance Xi 264 between the first illuminator 106 or the second illuminator 122 and a third plane 266 may also be included in the calculation. The third plane 266 may lie substantially orthogonal to the plane of the ISA 102 and may vertically bisect the ISA 102. The calculation of the position of the occluded location 254 in the first dimension 256 may also include a position 268 of the first apparent occluded location 116 along the line of intersection 258. A position 270 of the second apparent occluded location 128 along the line of intersection 258 may also be included in the calculation.

Figure 3:
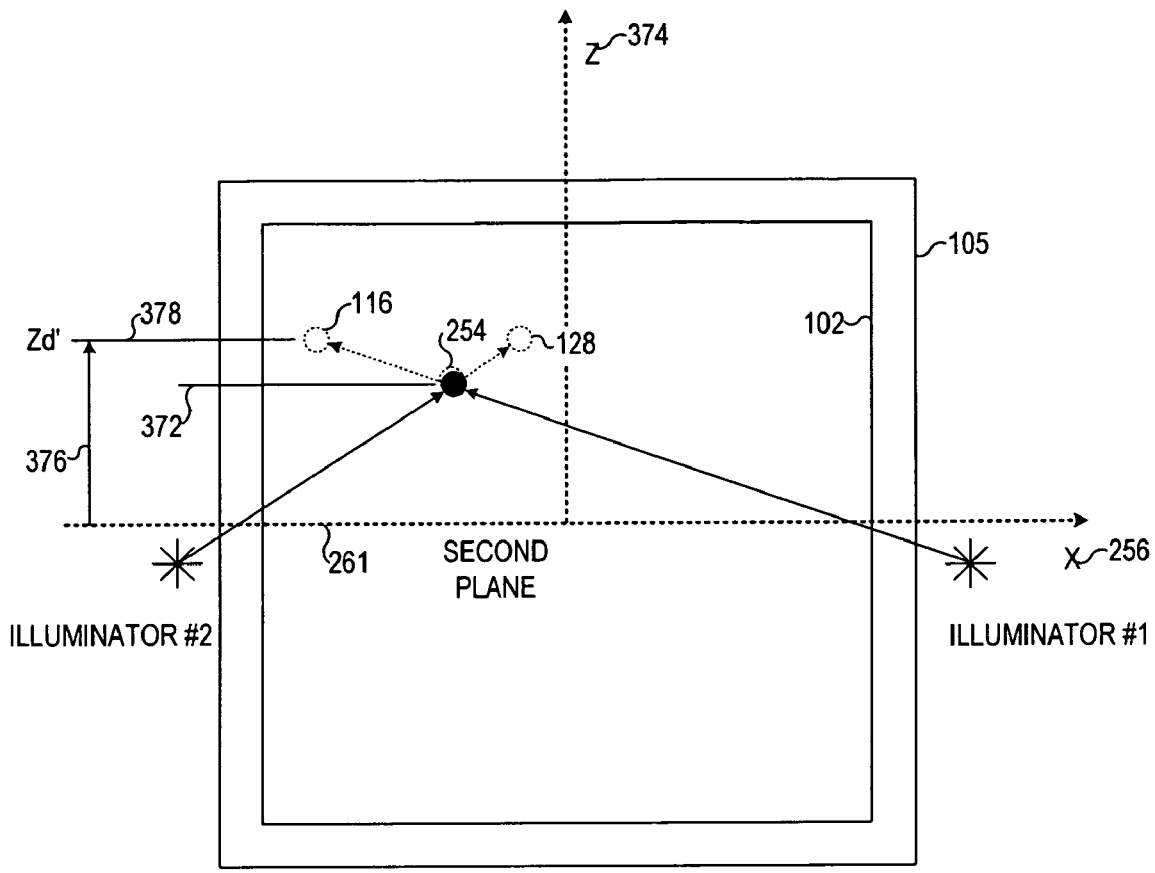
FIG. 3 is a frontal view of light paths and occlusion shadows according to various embodiments.

FIG. 3 is a frontal view of light paths and occlusion shadows associated with the apparatus 100 according to various embodiments. The occlusion projection logic 150 of FIG. 1 may be configured to determine a position 372 of the occluded location 254 in a second dimension 374. The second dimension 374 may lie substantially orthogonal to the first dimension 256 and may lie substantially coplanar with the first dimension 256. The position 372 may comprise a function of a perpendicular distance 376 between the second plane 261 and a position 378 (Zd') of the first apparent occluded location 116 in the second dimension 374 or the position 378 of the second apparent occluded location 128 in the second dimension 374.

Turning back to FIG. 1, the apparatus 100 may also include an occlusion mapping memory 179 coupled to the occlusion projection logic 150. The occlusion mapping memory 179 may store the position 252, 372 of the occluded location 254.

Other embodiments may include a system 180; and the system 180 may include one or more of the apparatus 100. The system 180 may also include illuminance correction logic 182 operationally coupled to the digital imager 103. The illuminance correction logic 182 may adjust an illuminance value associated with a level of illuminance sensed at an occluded location (e.g., the occluded location 254 of FIG. 2) on the ISA 102 during TTL image capture operations.

The system 180 may also include an ISA occlusion corrector 184 operationally coupled to the occlusion mapping memory 179 associated with the digital imager 103. An occlusion may be located on the ISA 102 (e.g., the occlusion 104), and an optical transmission value associated with the occlusion may be greater than or equal to a threshold value. If these conditions are met, the ISA occlusion corrector 184 may multiply the illuminance value associated with the level of illuminance sensed at the occluded location during TTL image capture operations by a gain.

The gain may be calculated from illuminance measurements made under calibrated conditions, including a substantially uniform illumination of the ISA 102, among other conditions. In some embodiments, the gain may be equal to an inverse of an optical transmission value associated with the occlusion. The optical transmission value may comprise a ratio of a first illuminance value corresponding to a first illuminance level sensed at the occluded location on the ISA 102 to a second illuminance value corresponding to a second illuminance level sensed by surrounding ISA elements.

The system 180 may further include a cover glass occlusion corrector 186 operationally coupled to the occlusion mapping memory 179. If an occlusion is located on the cover glass 105 (e.g., the occlusion 107), the cover glass occlusion corrector 186 may multiply the illuminance value corresponding to the level of illuminance sensed at the occluded location by a squared function. Turning to FIG. 2, the squared function may comprise a square of a quantity including a perpendicular distance $Y_C$ 262 between the ISA 102 and the cover glass 105 divided by a product of a focal length (F) of a lens associated with the digital imager 103, a width (W) of the occlusion, and the optical transmission value associated with the occlusion T. That is, the cover glass occlusion corrector 186 may increase an illuminance value associated with an illuminance level sensed at an occluded location by a factor of $(Y_C/F*W*T)^2$ if the occlusion causing a reduction in the illuminance value is located on the cover glass 105.

The system 180 may also include an illuminance interpolator 188 operationally coupled to the occlusion mapping memory 179. The illuminance interpolator 188 may replace the illuminance value associated with the occluded location with an interpolated illuminance value if T is less than a threshold value. The interpolated illuminance value may be calculated from illuminance values corresponding to illuminance levels sensed by surrounding ISA elements. The interpolated replacement may be made in the occlusion mapping memory 179 to prevent the correction factor gain from going to infinity as T associated with a dense occlusion approaches zero. Image noise may be thereby reduced.

Any of the components previously described may be implemented in a number of ways, including embodiments in software. Software embodiments may be used in a simulation system, and the output of such a system may drive the various apparatus described herein.

Thus, the apparatus 100; the ISA 102; the digital imager 103; the occlusions 104, 107; the cover glass 105; the illuminators 106, 122; the shadows 110, 124; the apparent occluded locations 116, 128; the light baffles 130, 131; the lens barrel 132; the ADC 134; the illuminance comparator 138; the location comparator 142; the occlusion localization logic 146; the occlusion projection logic 150; the positions 252, 268, 270, 372, 378; the occluded location 254; dimensions 256, 374; the line of intersection 258; the planes 260, 261, 266; the distances 262, 263, 264, 376; the occlusion mapping memory 179; the system 180; the illuminance level correction logic 182; the ISA occlusion corrector 184; the cover glass occlusion corrector 186; and the illuminance interpolator 188 may all be characterized as "modules" herein.

The modules may include hardware circuitry, optical components, single or multi-processor circuits, memory circuits, software program modules and objects, firmware, and combinations thereof, as desired by the architect of the apparatus 100 and the system 180 and as appropriate for particular implementations of various embodiments.

The apparatus and systems of various embodiments may be useful in applications other than locating occlusions in a digital imager and applying compensation factors to illuminance values associated with affected sensor elements. Thus, various embodiments of the invention are not to be so limited. The illustrations of the apparatus 100 and the system 180 are intended to provide a general understanding of the structure of various embodiments. They are not intended to serve as a complete description of all the elements and features of apparatus and systems that might make use of the structures described herein.

The novel apparatus and systems of various embodiments may comprise and/or be included in electronic circuitry used in computers, communication and signal processing circuitry, single-processor or multi-processor modules, single or multiple embedded processors, multi-core processors, data switches, and application-specific modules including multi-layer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 4A:
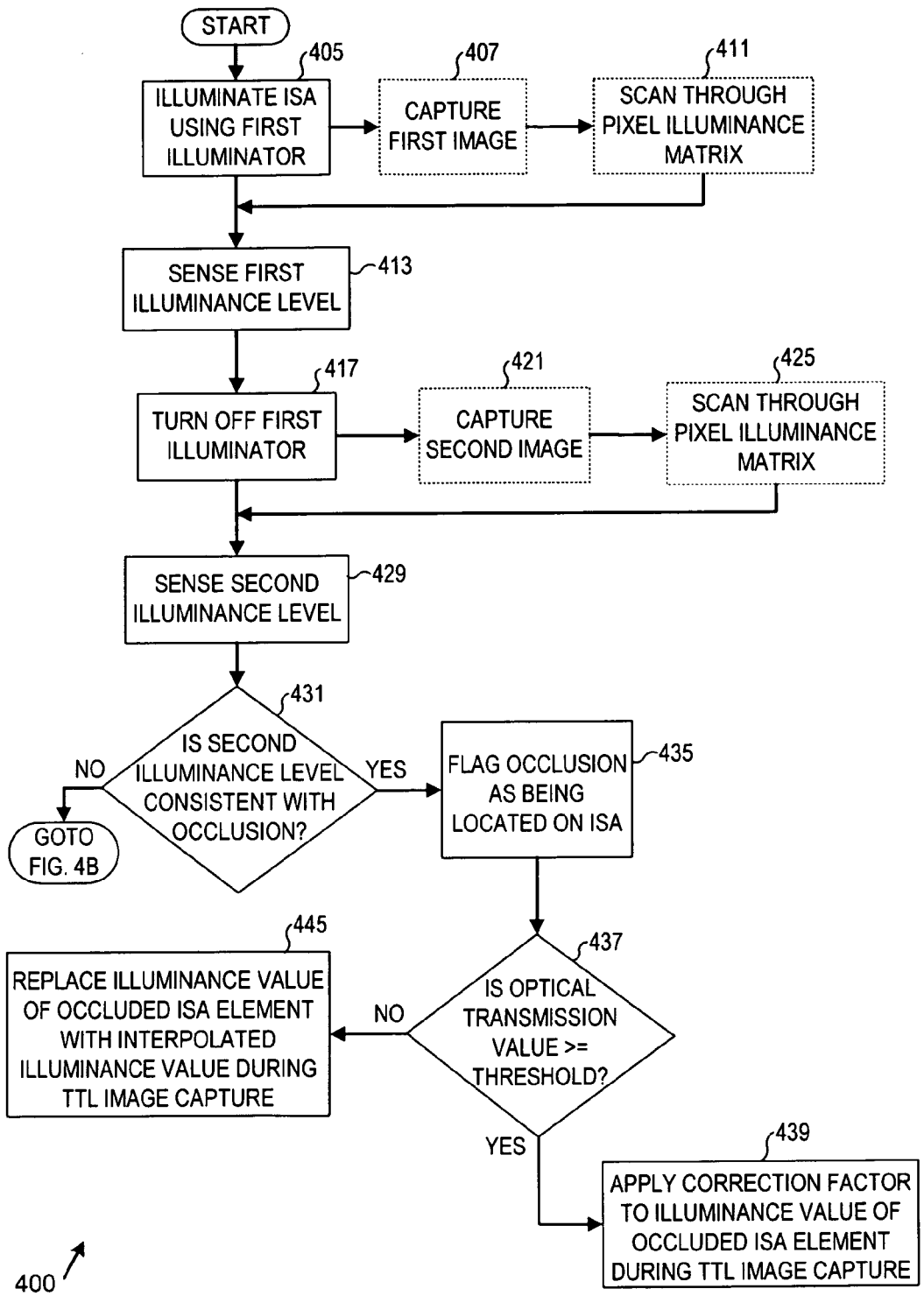
FIG. 4A is a flow diagram illustrating several methods according to various embodiments.
Figure 4B:
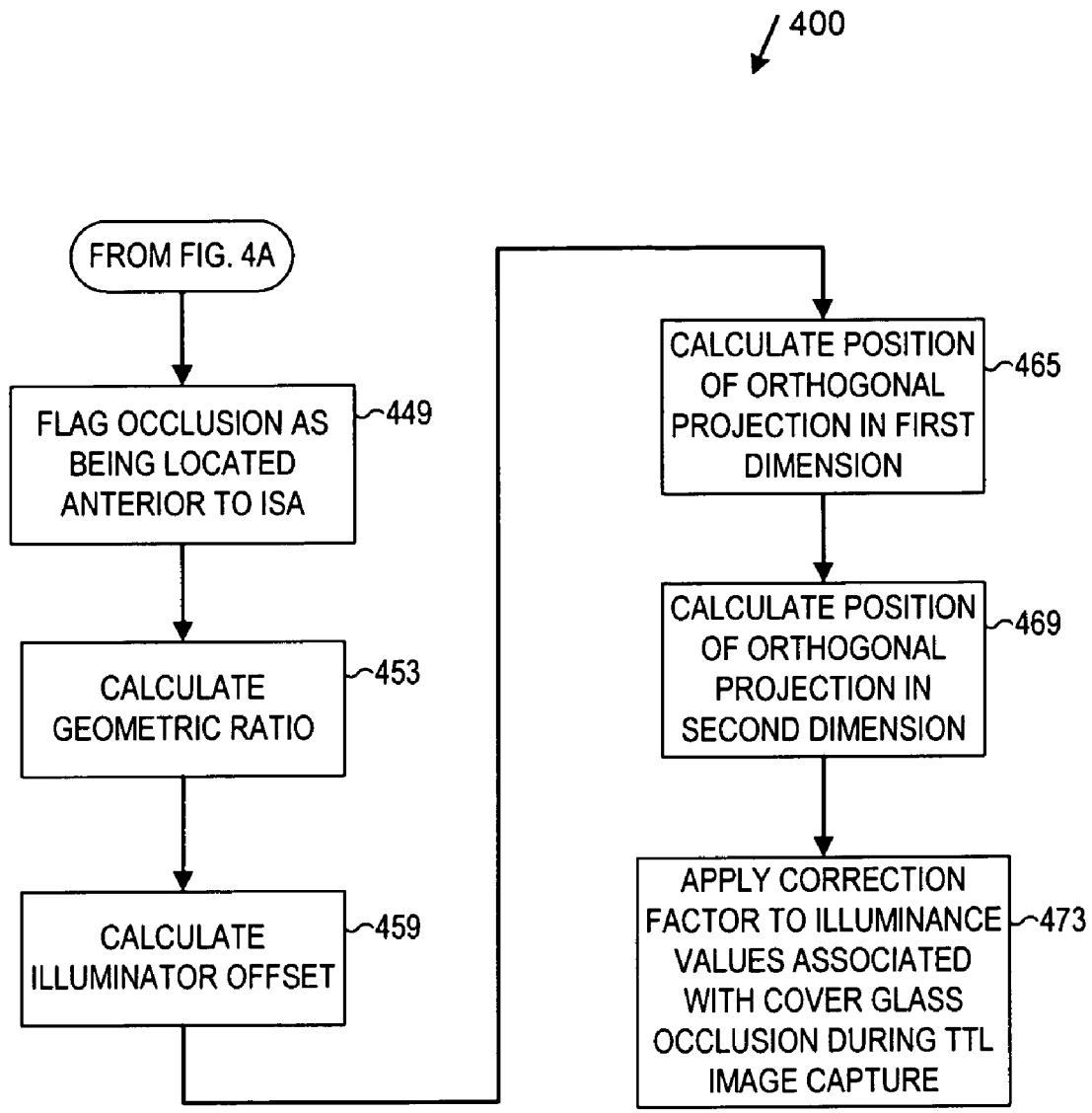
FIG. 4B is a continuation of the flow diagram illustrating several methods according to various embodiments.

FIGS. 4A and 4B are flow diagrams illustrating several methods according to various embodiments. A method 400 may commence with illuminating an ISA in a digital imager using a first illuminator during occlusion calibration operations, at block 405. In some embodiments the digital imager may comprise a digital camera, including perhaps a single lens reflex camera or a camera integrated into a cellular telephone. The method 400 may optionally include capturing a first image while the ISA is illuminated with the first illuminator, at block 407.

In some embodiments, the method 400 may include scanning through a matrix or list of pixel illuminance values associated with the ISA or with the first image during occlusion calibration operations. The matrix or list may be scanned to search for illuminance values associated with one or more occlusions, at block 411. The illuminance values associated with the occlusions may be recognized because they are smaller than a reference illuminance value. The reference illuminance value may comprise an average of illuminance values corresponding to illuminance levels sensed at surrounding, unoccluded sensor element locations.

The method 400 may thus include sensing a first illuminance level at a first apparent occluded location on the ISA, at block 413. The first illuminance level may fall within a range of reduced levels of illuminance consistent with an existence of an occlusion in a ray path between the first illuminator and the first apparent occluded location. That is, the first apparent occluded location may lie in a shadow cast as light from the first illuminator passes across the occlusion.

The method 400 may continue at block 417 with turning off the first illuminator. The method 400 may optionally include capturing a second image while the ISA is illuminated with a second illuminator laterally offset from the first illuminator, at block 421. The method 400 may also include scanning through a matrix or list of pixel illuminance values associated with the ISA or with the second image to search for illuminance values consistent with the occlusions, at block 425.

The method 400 may thus include sensing a second illuminance level at the first apparent occluded location while illuminating the ISA using the second illuminator, at block 429. The method 400 may further include testing the second illuminance level for correspondence to the range of reduced levels of illuminance consistent with the existence of the occlusion, at block 431. That is, the method 400 may test to determine whether a shadow cast by an occlusion illuminated by the second illuminator falls in substantially the same place on the ISA as the shadow cast by the occlusion while illuminated by the first illuminator.

The method 400 may continue at block 435 with flagging the occlusion as being located on the ISA at the first apparent occluded location if the second illuminance level falls within the range of reduced levels of illuminance consistent with the existence of the occlusion. The occlusion may be flagged by setting bits in a memory, among other methods.

If the occlusion is determined to be located on the ISA, the method 400 may include testing to determine whether an optical transmission value T associated with the occlusion is above a threshold level, at block 437. The optical transmission value T may be calculated from illuminance measurements made under calibrated conditions, including substantially uniformly illuminating the ISA, among other conditions. The optical transmission value T may comprise a ratio of a third illuminance value to a fourth illuminance value. The third illuminance value may correspond to a third illuminance level sensed by an occluded ISA element. The fourth illuminance value may correspond to a fourth illuminance level sensed by surrounding ISA elements. The fourth illuminance value may comprise an average of values of illuminance levels sensed by the surrounding ISA elements.

A value of the optical transmission value T associated with an occluded ISA element may determine how illuminance values captured from the occluded ISA element during TTL capture operations are corrected. If the optical transmission value T is greater than or equal to the threshold level, the method 400 may include applying a correction factor to the illuminance values, at block 439. The correction factor may comprise a gain equal to an inverse of the optical transmission value T associated with the occlusion.

If the optical transmission value T associated with the occlusion is less than the threshold value, the method 400 may continue at block 445 with replacing values of illuminance levels associated with the occluded ISA element during normal image capture operations. The illuminance values associated with the occluded ISA element may be replaced with an illuminance value calculated by interpolating from illuminance values corresponding to illuminance levels sensed by surrounding ISA elements. The interpolated replacements may be made in an image memory. The replacement mechanism may prevent the correction factor gain from going to infinity as an optical transmission value associated with a dense occlusion approaches zero. Image noise may be thereby reduced.

The method 400 may continue during occlusion calibration operations with flagging the occlusion as being located at a position anterior to the ISA if the second illuminance level does not correspond to the reduced illuminance level consistent with the existence of the occlusion, at block 449. In some embodiments, the position anterior to the ISA may comprise a location on a surface of a cover glass associated with the ISA. That is, an occlusion located on the cover glass may cause shadows cast from disperse light sources to fall at different locations on the ISA. Some embodiments may determine a position of the occlusion on the cover glass in order to predict a location on the ISA of a shadow projected onto the ISA by scene lighting during normal scene capture operations.

Turning back to FIG. 2 for reference during the following discussion, the method 400 may continue at block 453 with calculating a geometric ratio. The geometric ratio may comprise a perpendicular distance $Y_C$ between the ISA and the cover glass divided by a perpendicular distance Yi between the ISA and the first illuminator or the second illuminator. An illuminator offset Xi may be calculated as a perpendicular distance between the first illuminator or the second illuminator and a first plane substantially orthogonal to a plane of the ISA and vertically bisecting the ISA, at block 459. (It is noted that the "first plane" referred to instantly is shown as the third plane 266 of FIG. 2.)

The method 400 may also include locating a position of an orthogonal projection onto the ISA of the occlusion located on the cover glass. The orthogonal projection of the occlusion onto the ISA may be located in a first dimension substantially along a line of intersection of the plane of the ISA with a second plane substantially orthogonal to the plane of the ISA and horizontally bisecting the ISA, at block 465. The location in the first dimension may be calculated as a first quantity comprising the geometric ratio multiplied by the illuminator offset subtracted from a displacement of the first apparent occluded location along the line of intersection ($Xd_2-(Y_C/Yi*Xi)$). The first quantity may be divided by a second quantity comprising the geometric ratio plus one ($Y_C/Yi+1$). The first illuminator and the second illuminator may be equidistant from the first plane and may lie in a plane that is substantially mutually perpendicular to the plane of the ISA and the first plane.

The method 400 may further include calculating a position of the occlusion in a second dimension orthogonal to the first dimension and coplanar with the first dimension, at block 469. The position of the occlusion in the second dimension may be calculated as a perpendicular distance Zd' between the second plane and the first apparent occluded location divided by a third quantity comprising the geometric ratio plus one ($Y_C/Yi+1$).

The method 400 may also include applying a correction factor during TTL image capture operations to illuminance values associated with ISA elements occluded by the occlusion located on the cover glass, at block 473. The correction factor may comprise a squared function of a fourth quantity. The fourth quantity may comprise the perpendicular distance $Y_C$ between the ISA and the cover glass divided by a product of a focal length of a lens associated with the digital imager (F), a width of the occlusion (W), and an optical transmission value associated with the occlusion (T). That is, a correction factor of $(Y_C/F*W*T)^2$ may be applied to illuminance values associated with sensor elements lying in a shadow cast by an occlusion on the cover glass in the presence of scene lighting during normal scene capture operations. Other correction factors may be used.

It should be noted that the activities described herein may be executed in an order other than the order described. The various activities described with respect to the methods identified herein may also be executed in repetitive, serial, and/or parallel fashion.

A software program may be launched from a computer-readable medium in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The apparatus, systems, and methods disclosed herein may operate to identify and localize one or more occlusions associated with an ISA in a digital imager. An occlusion may be isolated to the ISA or to a position anterior to the ISA such as a cover glass associated with the ISA. Having isolated and localized the occlusion, an appropriate correction routine may operate to adjust illuminance values associated with occluded ISA elements. The identification of occlusions and remediation of their effects may increase customer satisfaction by increasing image quality. Costs may be reduced as a product return rate decreases.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:
    a first illuminator to project a first shadow of an occlusion onto an image sensor array (ISA) associated with a digital imager;
    a second illuminator laterally offset with respect to a face of the ISA from the first illuminator to project a second shadow of the occlusion onto the ISA; and
    components coupled to the ISA to determine whether the occlusion is located on the ISA based at least in part on a location of the first shadow on the ISA and a location of the second shadow on the ISA.

2. The apparatus of claim 1, wherein at least one of the first illuminator or the second illuminator comprises a light-emitting diode.

3. The apparatus of claim 1, wherein at least one of the first illuminator or the second illuminator is housed within a light baffle associated with the digital imager.

4. The apparatus of claim 1, wherein the digital imager comprises a digital camera.

5. The apparatus of claim 4, wherein the digital camera comprises at least one of a single-lens reflex (SLR) camera or a camera integrated into a cellular telephone.

6. The apparatus of claim 1, wherein at least one of the first illuminator or the second illuminator is located within a lens barrel associated with the digital imager.

7. The apparatus of claim 1, wherein the components include:
    an analog-to-digital converter (ADC) coupled to the ISA to convert illuminance signals received from ISA elements to digital illuminance values, wherein each of the digital illuminance values represents a level of illuminance sensed at an ISA element.

8. The apparatus of claim 7, wherein the components include:
    an illuminance comparator coupled to the ADC to detect an occluded condition at the ISA element by comparing a value of an illuminance level sensed at the ISA element with a value of a reference illuminance level.

9. The apparatus of claim 8, wherein the value of the reference illuminance level comprises an average of values of illuminance levels sensed from at least one of a set of ISA elements surrounding the ISA element or a set of all ISA elements in the ISA, wherein the ISA is substantially uniformly illuminated.

10. The apparatus of claim 1, wherein the components include:
    occlusion localization logic to flag the occlusion as being located on the ISA if the location of the first shadow and the location of the second shadow are substantially a same location and to flag the occlusion as being located at a location outside the ISA if the location of the first shadow and the location of the second shadow are different.

11. The apparatus of claim 10, wherein the location outside the ISA comprises a location on a surface of a cover glass associated with the ISA.

12. The apparatus of claim 11, wherein the components include:
    occlusion projection logic coupled to the occlusion localization logic to calculate a position of an occluded location on the ISA as an orthogonal projection onto the ISA of an occlusion located on the cover glass.

13. The apparatus of claim 12, wherein the occlusion projection logic is configured to determine a position of the occluded location in a first dimension substantially along a line of intersection of a plane of the ISA with a second plane substantially orthogonal to the plane of the ISA and horizontally bisecting the ISA as a function of:
    a perpendicular distance $Y_C$ between the ISA and the cover glass, a perpendicular distance Yi between the ISA and at least one of the first illuminator or the second illuminator,
    a perpendicular distance Xi between at least one of the first illuminator or the second illuminator and a third plane substantially orthogonal to the plane of the ISA and vertically bisecting the ISA, and
    at least one of a position of the location of the first shadow substantially along the line of intersection or a position of the location of the second shadow substantially along the line of intersection.

14. The apparatus of claim 13, wherein the occlusion projection logic is configured to determine a position of the occluded location in a second dimension substantially orthogonal to the first dimension and coplanar with the first dimension as a function of a perpendicular distance Zd' between the second plane orthogonal to the plane of the ISA and horizontally bisecting the ISA and at least one of a position of the location of the first shadow in the second dimension or a position of the location of the second shadow in the second dimension.

15. The apparatus of claim 12, wherein the components include:
    an occlusion mapping memory coupled to the occlusion projection logic to store the position of the occluded location.

16. A system, including:
    a first illuminator to project a first shadow of an occlusion onto an image sensor array (ISA) in a digital imager during occlusion calibration operations;

a second illuminator laterally offset with respect to a face of the ISA from the first illuminator to project a second shadow of the occlusion onto the ISA during the occlusion calibration operations;

components coupled to the ISA to determine whether the occlusion is located on the ISA based at least in part on a location of the first shadow on the ISA and a location of the second shadow on the ISA; and illuminance correction logic operationally coupled to the digital imager to adjust a first illuminance value associated with a first level of illuminance sensed at an occluded location on the ISA during through-the-lens (TTL) image capture operations.

17. The system of claim 16, further including:

an ISA occlusion corrector operationally coupled to an occlusion mapping memory associated with the digital imager, the ISA occlusion corrector to multiply the first illuminance value by a gain equal to an inverse of an optical transmission value associated with the occlusion if the occlusion is located on the ISA and if the optical transmission value is greater than a threshold value or equal to the threshold value.

18. The system of claim 17, wherein the optical transmission value associated with the occlusion is equal to a ratio of a second illuminance value corresponding to a second illuminance level sensed at the occluded location on the ISA to a third illuminance value corresponding to a third illuminance level sensed by surrounding ISA elements, wherein the second illuminance level and the third illuminance level are sensed under calibrated conditions.

19. The system of claim 18, wherein the calibrated conditions include a substantially uniform illumination of the ISA.

20. The system of claim 17, further including:

a cover glass occlusion corrector operationally coupled to the occlusion mapping memory to multiply the first illuminance value by a squared function of a quantity comprising a perpendicular distance between the ISA and a cover glass ($Y_C$) divided by a product of a focal length of a lens associated with the digital imager (F), a width of the occlusion (W), and the optical transmission value associated with the occlusion, if the occlusion is located on the cover glass.

21. The system of claim 17, further including:

an illuminance interpolator operationally coupled to the occlusion mapping memory to replace the first illuminance value with an interpolated illuminance value calculated from illuminance levels sensed by surrounding ISA elements if the optical transmission value associated with the occlusion is less than a threshold value.

22. A method, including:

during occlusion calibration operations:

illuminating an image sensor array (ISA) associated with a digital imager using a first illuminator;

sensing a first illuminance level at a location on the ISA, wherein the first illuminance level corresponds to a reduced illuminance level consistent with an existence of an occlusion, and wherein the occlusion is located in a ray path between the first illuminator and the location;

turning off the first illuminator;

sensing a second illuminance level at the location while illuminating the ISA using a second illuminator laterally offset with respect to a face of the ISA from the first illuminator;

testing the second illuminance level for correspondence to the reduced illuminance level consistent with the existence of the occlusion; and flagging the occlusion as being located at the location on the ISA when the occlusion exists and when the second illuminance level corresponds to the reduced illuminance level consistent with the existence of the occlusion.

23. The method of claim 22, wherein flagging includes setting bits
in a memory.

24. The method of claim 23, further including:

applying a correction factor to a value of a third illuminance level sensed by an occluded ISA element during through-the-lens (TTL) image capture operations if the occlusion is located on the ISA and if an optical transmission value associated with the occlusion is greater than a threshold value or equal to the threshold value, wherein the correction factor comprises a gain equal to an inverse of an optical transmission value associated with the occlusion.

25. The method of claim 24, wherein the optical transmission value associated with the occlusion comprises a ratio of a value of a fourth illuminance level sensed by the occluded ISA element to a value of a fifth illuminance level sensed by surrounding ISA elements, the fourth and fifth illuminance levels sensed under calibrated conditions.

26. The method of claim 25, wherein the calibrated conditions include:

substantially uniformly illuminating the ISA.

27. The method of claim 24, further including:

replacing the value of the third illuminance level with an illuminance value calculated by interpolating from values of illuminance levels sensed by surrounding ISA elements during the TTL image capture operations if the optical transmission value associated with the occlusion is less than a threshold value.

28. The method of claim 22, further including:

in a memory, flagging the occlusion as being located at a position anterior to the ISA if the second illuminance level is not consistent with the existence of the occlusion.

29. The method of claim 28, wherein the position anterior to the ISA comprises a location on a surface of a cover glass associated with the ISA.

30. The method of claim 29, further including:

calculating a geometric ratio of a perpendicular distance $Y_C$ between the ISA and the cover glass divided by a perpendicular distance Yi between the ISA and at least one of the first illuminator or the second illuminator; and calculating an illuminator offset Xi as a perpendicular distance between at least one of the first illuminator or the second illuminator and a first plane substantially orthogonal to a plane of the ISA and vertically bisecting the ISA.

31. The method of claim 30, further including locating a position of an orthogonal projection onto the ISA of an occlusion located on the cover glass by:

calculating a position of the orthogonal projection of the occlusion onto the ISA in a first dimension substantially along a line of intersection of the plane of the ISA with a second plane substantially orthogonal to the plane of the ISA and horizontally bisecting the ISA, the position of the projection of the occlusion in the first dimension calculated as a first quantity comprising the geometric ratio multiplied by the illuminator offset subtracted from a displacement of the location along the line of intersection ($Xd_2-(Y_C/Yi*Xi)$), the first quantity divided by a second quantity comprising the geometric ratio plus one ($Y_C/Yi+1$), wherein the first illuminator and the second illuminator are substantially equidistant from the first plane and lie in a plane that is mutually perpendicular to the plane of the ISA and the first plane; and calculating a position of a projection of the occlusion in a second dimension orthogonal to the first dimension and coplanar with the first dimension as a perpendicular distance Zd' between the second plane and the location divided by a third quantity comprising the geometric ratio plus one ($Y_C/Yi+1$).

32. The method of claim 31, further including:

applying a correction factor to a value of a sixth illuminance level sensed by an occluded ISA element during through-the-lens image capture operations if the occlusion is located on the cover glass, wherein the correction factor comprises a squared function of a fourth quantity comprising the perpendicular distance $Y_C$ between the ISA and the cover glass divided by a product of a focal length of a lens associated with the digital imager (F), a width of the occlusion (W), and an optical transmission value associated with the occlusion (T).

33. The method of claim 22, further including:

capturing a first image while the ISA is illuminated with the first illuminator; and capturing a second image while the ISA is illuminated with the second illuminator.

34. The method of claim 33, further including:

scanning through a matrix of pixel illuminance values associated with at least one of the ISA, the first image, or the second image during occlusion calibration operations to search for illuminance values associated with at least one of the occlusion or additional occlusions.

35. The method of claim 22, wherein the digital imager comprises a digital camera.

36. The method of claim 35, wherein the digital camera comprises a single lens reflex camera.

* * * * *